Patented Apr. 10, 1951

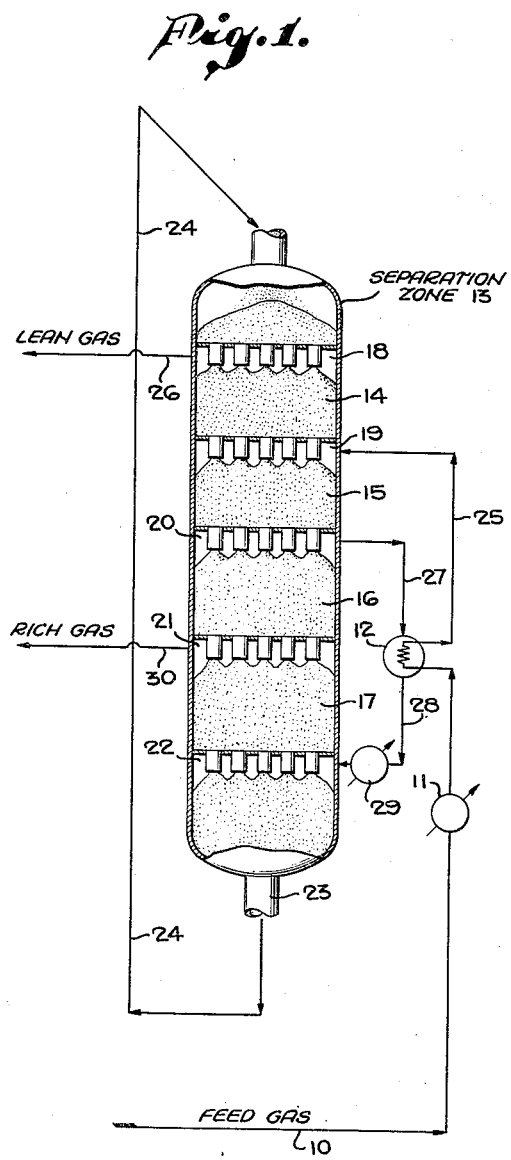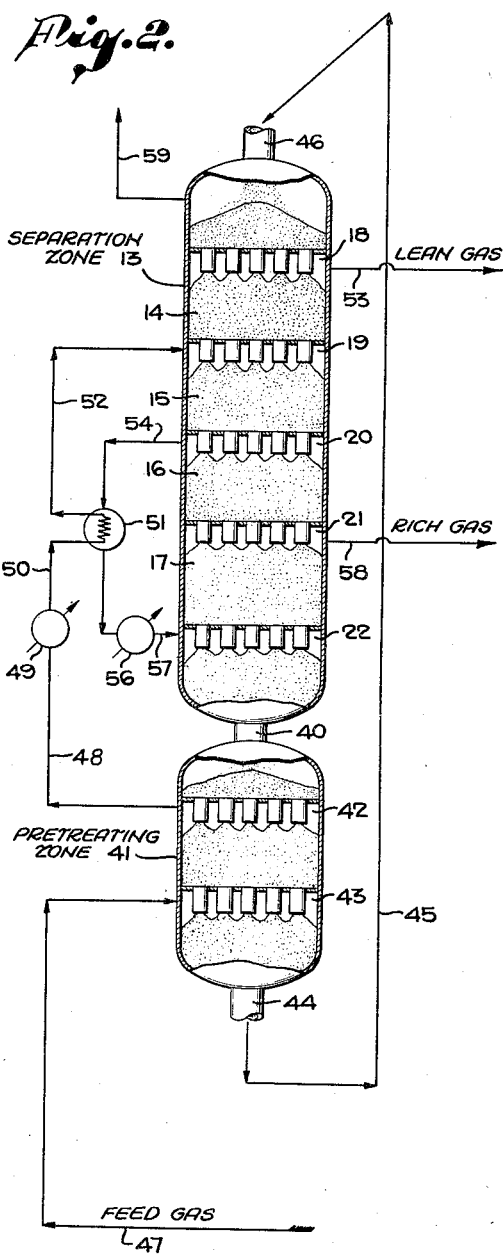

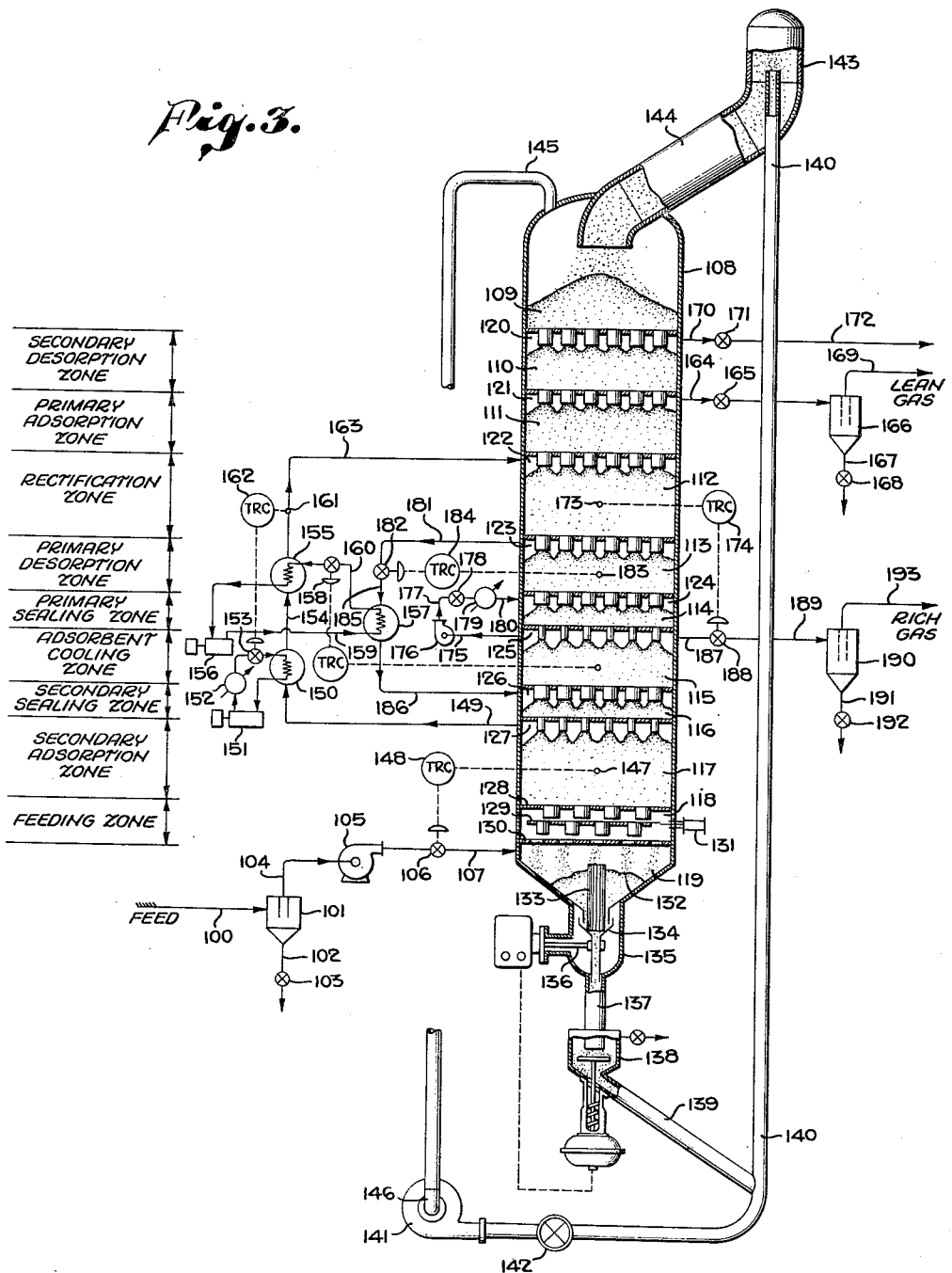

2,548,192

UNITED STATES PATENT OFFICE 2,548,192

ADSORPTION PROCESS AND APPARATUS

Clyde H. O. Berg, Long Beach, Calif., assignor to Union Oil Company of California, Los Angeles, Calif., a corporation of California Application September 30, 1947, Serial No. 776,959

23 Claims. (Cl. 183—4.2)

This invention relates to the separation of gaseous mixtures by selective adsorption and is particularly directed to a process and apparatus for the separation of gaseous mixtures at atmospheric and subatmospheric temperatures by continuous selective adsorption on a solid granular adsorbent.

Many compounds which are normally gaseous at atmospheric temperature and pressure conditions have heretofore been separated by distillation at high pressure and low temperatures. Such is the case with gaseous mixtures containing relatively large proportions of inorganic gases such as helium and other rare gases, hydrogen, nitrogen, oxygen, carbon monoxide, carbon dioxide, and the like. Low temperature distillation has been quite extensively applied to the separation of oxygen from air and involves temperatures of the order of $-300°$ F. It is to the separation of oxygen from nitrogen from air that the present invention is particularly directed.

Oxygen diluted with nitrogen in the form of air is employed in enormous quantities in such industrial processes as iron ore smelting, steel manufacture in Bessemer converters or open hearth furnaces, the roasting of sulfide ores such as pyrites, and other sulfur compounds, the production of inorganic acids through the oxidation of nitrogen and sulfur, the partial oxidation of organic compounds to produce oxygenated derivatives, the continuous gasification of carbonaceous materials such as coke and coal to produce a gas containing carbon monoxide and hydrogen suitable for use as fuel or for the synthesis of liquid hydrocarbons and synthetic oxygenated compounds, and the attainment of elevated temperatures for calcination and other high temperature reactions. In such applications the nitrogen present in the air serves merely as a diluent for the oxygen which is the active ingredient and in nearly every case benefits would be realized through the use of a smaller quantity of a gas containing oxygen if the oxygen content were higher. Nearly every operation such as those cited would benefit from either employing as a source of oxygen a gas containing a higher concentration of oxygen than air such as an oxygen enriched air or through the application of pure gaseous oxygen.

The desire for quantities of substantially pure oxygen has led to the development of a number of processes for the separation of this element from air and water where its occurrence is most extensive. These processes may be classified either as mechanical, electrical or chemical.

The mechanical methods for air purification may be exemplified by the one which in the past has found the greatest usage, the compression, liquefaction and distillation of air. This operation when conducted at slightly above atmospheric pressure requires temperatures as low as about $-300°$ F. Such abnormally low temperatures as these present an acute design and operational problem since the design, insulation and operation of equipment at such low temperatures is somewhat difficult. Further, in order to obtain efficient use of the refrigeration required in such a process a complex system of heat interchangers is required. Since the air to be separated contains the usual atmospheric contaminants comprising carbon dioxide, water, and hydrocarbons to a lesser extent, which solidify at the temperatures involved in the separation process, the complex heat interchanger system must be provided with means for preventing solidified contaminants from fouling the heat interchanger surfaces thus stopping the operation. In the low temperature distillation of air even with the utmost precautions it is necessary periodically to shut down the distillation column and thaw out the equipment to remove solidified water and carbon dioxide which gradually accumulate in the equipment. The mechanical separation of air by low temperature distillation is, however, capable of producing quantities of high purity oxygen at costs well below those required to produce oxygen by the aforementioned electrical or chemical processes.

The electrolysis of aqueous electrolytes permits the separation of the aqueous solvent into its elements oxygen and hydrogen. It is possible under careful operation to obtain gaseous products of extremely high purity by this electrical method. It is, however, an expensive operation since the cost of electricity in most localities is not sufficiently low.

High purity oxygen may be also prepared by chemical methods through the decomposition of certain chemicals which liberate that element. A few compounds are now known which react with oxygen of the air at atmospheric conditions of pressure and temperature and which can be made to liberate this oxygen at higher temperatures and lower pressures. Cyclic processes involving this type of chemical reaction have been perfected, which are unable, however, to compete with cheap oxygen produced by air distillation.

The mechanical, electrical and chemical processes for oxygen preparation contain inherent disadvantages which may be overcome by the application of the present invention as hereinafter more fully described. I have found that oxygen may be produced in quantity and having the extremely high purity desirable in most applications by the utilization of an improved modification of the selective adsorption process adapted to separate atmospheric air into its constituents at atmospheric and subatmospheric temperatures. The oxygen and nitrogen present in air may be separated from one another by taking advantage of the selective adsorption characteristics of certain solid adsorbents. An efficient and economical fractionation of air is effected by applying the principles of the selective adsorption process modified to permit atmospheric and subatmospheric temperature operations. The selective adsorption process for oxygen production as hereinafter more fully described permits the production of high purity oxygen without the cumbersome expensive and complex heat interchanger system and without the abnormally low operating temperatures necessary to the mechanical process of air distillation and without the economical disadvantages inherent in the electrical and chemical processes previously mentioned.

The granular solid adsorbents exhibit phenomena of preferential adsorption of certain gases present in a mixture while leaving other gases substantially unadsorbed or adsorbed to a lesser degree. For example, adsorbent charcoal exhibits preferential adsorption of higher molecular weight hydrocarbon gases such as those having between about three to five carbon atoms per molecule over those having less than three carbon atoms per molecule. With such a solid adsorbent, gaseous mixtures containing $C_1$, $C_2$, $C_3$, and $C_4$ hydrocarbons may be separated into fractions each of which contains hydrocarbons having the same number of carbon atoms per molecule and which are substantially pure. In the adsorption of inorganic gases by solid adsorbents such as charcoal there appears to be a correlation in the adsorbability of these gases with the critical temperature of the gas, those gases having low critical temperature such as hydrogen and helium remaining substantially unadsorbed by the charcoal even at low temperatures.

In general, the process of separating gaseous mixtures by selective adsorption on granular adsorbents, such as, for example, activated charcoal, activated aluminum oxide, silica gel, or the like, involves the steps of contacting countercurrently the gaseous mixture with the adsorbent, preferably in a moving bed. In a moving bed operation the adsorbent, upon which certain of the gaseous components have been adsorbed, flows from the adsorption zone through one or more rectification zones and into a stripping or desorption zone wherein the adsorbed components are caused to be desorbed from the adsorbent by the application of heat and a stripping gas, such as steam, for example, to form a lean adsorbent. The lean adsorbent is subsequently cooled prior to repassage through the adsorption section.

The selective adsorption process has been improved and modified as hereinafter more fully described to permit the use of the solid adsorbent employed in the process as a heat transfer medium in the cooling of the gaseous mixture to be separated to the desired temperature.

It is a primary object of the present invention to provide an improved, simplified and more economical process for the production of high purity oxygen in large quantities from air.

A further object is to provide an improved selective adsorption process for separating gaseous mixtures having low boiling points and which is adapted to operate at atmospheric and subatmospheric temperatures.

Another object is to provide a selective adsorption process by which air may be separated into substantially pure fractions of oxygen and nitrogen at higher temperatures than those required in air distillation.

An additional object of the present invention is to provide a process for the production of oxygen by the fractionation of air, which process eliminates the necessity for expensive and complex heat exchange equipment and the necessity for operating at abnormally low temperatures and high pressures.

Other objects and advantages of the invention will become apparent to those skilled in the art as the description thereof proceeds.

Briefly, the present invention comprises a process for the separation of gaseous mixtures at atmospheric and subatmospheric temperatures by the continuous selective adsorption of the more readily adsorbable constituents of such mixtures on a solid granular adsorbent and leaving the less readily adsorbable constituents as a substantially unadsorbed gas while simultaneously employing the adsorbent as a heat transfer medium. The gaseous mixture to be separated is cooled to a desired temperature through direct contact with the cooled adsorbent, by refrigeration, or by heat interchange with cold product streams. The improved process also involves the use of a portion of the gas products to cool the granular adsorbent to a low temperature while warming the gas product to a temperature approximating that of the atmosphere before removal from the selective adsorption column. The heat transfer between gas products and the adsorbent and between the feed gas and the adsorbent is accomplished by passing the respective gases in direct contact with the adsorbent. The desorption of the more readily adsorbable constituents present in the adsorbent is accomplished by heating a fraction of one of the gas products and subjecting further quantities of the rich adsorbent to direct contact with the heated gas thus heating the rich adsorbent and causing desorption of further quantities of rich gas. An unusually efficient process for the seperation of gaseous mixtures results which requires less refrigeration than separating such gaseous mixtures by low temperature distillation. This outstanding advantage of the present invention is attributable to the use of the solid adsorbent as a heat transfer medium as well as a separating agent.

The present invention may be more clearly understood by reference to the accompanying drawings in which, Figure 1 is a schematic diagram showing an elevation view of the separation zone of the improved selective adsorption apparatus according to the present invention, Figure 2 shows a similar schematic diagram of an elevation view in cross section of the improved selective adsorption apparatus in which a pretreating zone and a separation zone are employed, and Figure 3 shows a detailed cross section of an elevation view of the selective adsorption column adapted to the subatmospheric temperature seperation of gaseous mixtures such as air.

Referring now more particularly to Figure 1, the gaseous mixture to be separated is introduced by means of line 10 into feed gas cooler 11 wherein the temperature of the gaseous mixture to be separated is lowered prior to passing through interchanger 12. In interchanger 12, the feed gas is further cooled to the desired temperature for introduction into separation zone 13. Separation zone 13 shown in Figure 1 as a vessel comprises adsorption zone 14, rectification zone 15, desorption zone 16 and adsorbent heating zone 17. Also provided are lean gas disengaging zone 18, feed gas engaging zone 19, recycle gas disengaging zone 20, rich gas disengaging zone 21, and recycle gas engaging zone 22. A continuous flow of a solid granular adsorbent is maintained downwardly by gravity through the aforementioned zones in separation zone 13, withdrawn from the lower portion of separation zone 13 by means of transfer line 23 and returned to the upper portion of separation zone 13 by means of line 24. The granular adsorbent is thus recycled through the separation zone 13.

The cooled gaseous mixture removed from interchanger 12 is introduced by means of line 25 through feed gas engaging zone 19 to flow upwardly through adsorption zone 14 counter-current to the downwardly flowing adsorbent. The downwardly flowing adsorbent adsorbs the more readily adsorbable constituents together with a small amount of the less readily adsorbable constituents of the cooled gaseous mixture to form a rich adsorbent and a lean gas comprising the less readily adsorbable constituents. The lean gas passes upwardly through the upper portion of adsorption zone 14 wherein it is warmed to approximately atmospheric temperatures by direct countercurrent contact with the warm downwardly flowing adsorbent. The lean gas is removed by means of line 26 from adsorption zone 14. The adsorbent passing downwardly through adsorption zone 14 is cooled by direct heat exchange to approximately the same temperature as that of the cooled feed gas introduced via feed gas engaging zone 19. The rich adsorbent containing the more readily adsorbable constituents of the gaseous mixture flows downwardly through the tubes of feed gas engaging zone 19 and enters rectification zone 15. The adsorbent there contacts a reflux gas containing the more readily adsorbable contituents of the gaseous mixture which serves to preferentially desorb any remaining quantities of less readily adsorbable constituents possibly present on the rich adsorbent. These less readily adsorbable constituents flow upwardly through adsorption zone 14 and are subsequently removed with the lean gas. A rectified adsorbent containing only the more readily adsorbable constituents desired in the rich gas fraction flows downwardly from rectification zone 15 into desorption zone 16 wherein the rectified charcoal contacts further quantities of a heated reflux gas containing the more readily adsorbable constituents thereby increasing the temperature of the rectified adsorbent and causing the desorption of a portion of the more readily adsorbable constituents. The constituents thus desorbed flow upwardly to recycle gas disengaging zone 20 and while a portion of these constituents are removed therefrom as a recycle gas by means of line 27 the remaining portion is introduced as reflux into rectification zone 15. A recycle gas is passed by means of line 27 through heat interchanger 12 wherein it is heated, subsequently passed by means of line 28 through recycle gas heater 29 and is introduced via recycle gas engaging zone 22 into adsorbent heating zone 17. The heated recycle gas thus introduced passes upwardly through adsorbent heating zone 17 countercurrent to the downwardly flowing adsorbent and a direct heat interchange occurs. The downwardly flowing adsorbent is heated thereby causing the desorption of further quantities of more readily adsorbable constituents to form a rich gas and the rich gas passing therethrough is cooled to approximately atmospheric temperature. A portion of this rich gas passes upwardly through gas disengaging zone 21 and is employed in desorption zone 16 as reflux while the remainder of the rich gas is removed from rich gas disengaging zone 21 by means of line 30 as a rich gas product. The heated adsorbent passes downwardly through a recycle gas engaging zone 22, is removed through transfer line 23 from the lower portion of separation zone 13 and is subsequently returned to the upper portion of separation zone 13 by means of line 24. As previously described, the heated adsorbent passes downwardly through the upper portion of adsorption zone 14 wherein it is cooled by direct heat exchange with the lean gas to the temperature desired for adsorption.

In the modification just described it is desirable that the mass rate of flow of adsorbent downwardly through the separation zone and the mass rate of feed gas introduced into separation zone be adjusted to so that the total heat capacity of the flowing granular adsorbent approximates that of the gaseous mixture to be separated for conditions of minimum refrigeration requirement. Feed gas cooler 11 and recycle gas heater 29 are required in order to supply the energy of separation and to make up heat leaks from the atmosphere into the system which operates at a subatmospheric temperature. The major proportion of the heat exchange required in the selective adsorption process described takes place directly within the separation zone between the various gas streams and the adsorbent and in general heat interchanger 12 is not as complex as the interchangers required in air distillation processes.

Referring now more particularly to Figure 2, the second modification of the selective adsorption process is shown wherein the separation zone previously described in connection with Figure 1 is augmented by a pretreating zone which is employed in order to remove impurities from the gaseous mixture being separated. Portions of the selective adsorption apparatus also shown in Figure 1 are indicated with the same numbers in Figure 2. In Figure 2 separation zone 13 is provided with adsorption zone 14, rectification zone 15, desorption zone 16, adsorbent heating zone 17 and with lean gas disengaging zone 18, feed gas engaging zone 19, recycle gas disengaging zone 20, rich gas disengaging zone 21, and recycle gas engaging zone 22. The solid granular adsorbent employed is passed downwardly through separation zone 13 and is removed from the bottom thereof by means of line 40 and is introduced into pretreating zone 41. Pretreating zone 41 is further provided with purified feed disengaging zone 42, impure feed engaging zone 43, and transfer line 44. The adsorbent removed by means of transfer line 44 from the lower portion of pretreating zone 41 is conveyed by means of line 45 to the upper portion of separation zone 13 where it is introduced by means of line 46 to repass downwardly through the aforementioned separation and pretreating zones.

Oftentimes gaseous mixtures contain contaminants which are best removed prior to the gaseous separation in order that ultimately pure products may be produced or that the apparatus may be prevented from becoming inoperable, and for this reason pretreating zone 41 is employed. The gaseous mixture comprising the feed gas to be separated is introduced by means of line 47 into impure feed engaging zone 43 of pretreating zone 41 to pass upwardly therethrough countercurrent to the downwardly flowing adsorbent. During passage therethrough the contaminants present in the impure feed are adsorbed on the adsorbent to form a contaminated adsorbent and a purified feed gas. The contaminated adsorbent is conveyed as previously described by means of lines 44, 45, and 46 to the upper portion of separation zone 13. The purified feed is removed from purified feed disengaging zone 42 and passed by means of line 48 through feed gas cooler 49 wherein the temperature is lowered an appropriate amount prior to the introduction of the feed gas by means of line 50 into heat interchanger 51. The feed gas is further cooled to the desired adsorption temperature in heat interchanger 51 and is removed therefrom and introduced into feed gas engaging zone 19 by means of line 52. The operation of separation zone 13 in the present modification is substantially the same as the operation of separation zone 13 as described in connection with Figure 1. The more readily adsorbable constituents are removed from the feed gas in adsorption zone 14 to form a rich adsorbent, traces of the less readily adsorbable constituents are desorbed from the rich adsorbent in rectification zone 15, and the less readily adsorbable constituents thus desorbed form a lean gas, a portion of which is removed by means of line 53 from lean gas disengaging zone 18. The rich adsorbent passing downwardly through adsorbent heating zone 17 is contacted by a heated recycle gas containing the more readily adsorbable constituents removed from recycle gas disengaging zone 20 and passed by means of line 54 through heat interchanger 51, subsequently through line 55 to recycle gas heater 56 and thence by means of line 57 into recycle gas engaging zone 22. The heated recycle gas thus introduced subsequently passes upwardly through adsorbent heating zone 17 in direct heat exchange with the downwardly flowing rich adsorbent thereby heating and desorbing from the rich adsorbent further quantities of the more readily adsorbable constituents adsorbed thereon to form a rich gas. A portion of this rich gas passes upwardly through rich gas disengaging zone 21 into rectification zone 15 wherein it is employed as reflux and another portion comprises the aforementioned recycle gas. The remaining portion of the rich gas is removed from rich gas disengaging zone 21 by means of line 58 as a rich gas product. The heated adsorbent, from which a major portion of the more readily adsorbable constituents has been removed, is removed from the lower portion of separation zone 13 by means of line 49 at a temperature substantially below that of the incoming feed gas. The adsorbent passes downwardly through pretreating zone 40 wherein, as previously described, it adsorbs contaminants present in the entering feed gas and simultaneously cools the entering feed gas in direct heat exchange. The heated contaminated adsorbent is conveyed from the lower portion of pretreating zone 41 to the upper portion of separation zone 13. In the portion of separation zone 13 above lean gas disengaging zone 18 the contaminants present on the contaminated adsorbent are desorbed by allowing a portion of the lean gas normally removed by means of line 53 to flow upwardly from lean gas disengaging zone 18 through the contaminated adsorbent above. The contaminants together with that portion of the lean gas are removed from the upper portion of separation zone 13 by means of line 59. An uncontaminated adsorbent is thus introduced into adsorption zone 14 wherein it is cooled to the desired adsorption temperature in direct heat exchange with the lean gas product passing upwardly therethrough.

The present modification of the selective adsorption apparatus is well adapted to the separation of gaseous mixtures containing small amounts of contaminants which are undesirable either in the apparatus or in the finished products. As has been noted, pretreating zone 41 serves a dual purpose in removing such contaminants and also precooling the gaseous mixture to be separated in separation zone 13. As previously indicated in connection with Figure 1, feed gas cooler 49 and recycle gas heater 56 are employed to counterbalance heat leaks from the atmosphere into the system and to supply the necessary energy of separation theoretically required in the separated of any gaseous mixtures.

It will be noted that in both modifications of selective adsorption apparatus shown in Figures 1 and 2, a gas-to-gas heat exchanger is required. Since the total required amount of refrigeration involved in separating any given gaseous mixture by selective adsorption is less than that required in the conventional distillation method, these heat interchangers are considerably smaller than those required in distillation processes and handle gases containing no contaminants tending to foul the heat exchange areas. The size is further reduced in the case of the modification shown in Figure 2 by the fact that a partial precooling is obtained during the passage of the feed gas through pretreating zone 41.

The third modification of selective adsorption apparatus may be realized wherein a complete elimination of gas-to-gas heat exchangers is realized in a process which follows the basic principles indicated in Figure 1. Such a modification is illustrated in Figure 3 and will subsequently be described.

In order to facilitate the description of this third modification of selective adsorption apparatus and to exemplify operating conditions encountered in the application of this process to a given separation, the description of Figure 3 includes data for the separation of air into its constituent parts by the application of the improved selective adsorption process. It is to be understood, however, that the accompanying description is not meant to indicate limitations of the present invention or infer that gaseous mixtures other than air are not separable thereby, but to more clearly described conditions encountered in the application of the improved selective adsorption process to the separation of gaseous mixtures at subatmospheric temperatures.

Referring now more particularly to Figure 3, 10,000 MSCF per day (1 MSCF is equivalent to 1,000 standard cubic feet) or about 417,000 standard cubic feet per hour of air are introduced by means of line 100 into separator 101 wherein entrained solids and liquids are removed therefrom. Separator 101 may comprise a centrifugal type separator such as a cylone separator as indicated in Figure 3, or may comprise suitable filters such as masses of steel wool, glass wool, beds of fibrous materials containing oil. In the case where separator 101 comprises a cyclone separator solid and liquid materials disengaged from the entering air are removed from separator 101 by means of line 102 controled by valve 103 and the treated air is removed by means of line 104. Under the influence of a pressure gradient created by feed gas compressor or blower 105, solid- and liquid-free air is introduced into selective adsorption column 108 through line 107 controlled by control valve 106. Selective adsorption column 108 is a vertical column having an internal diameter of 4 feet 6 inches and stands about 80 feet high. A charcoal circulation of 37 tons per hour is maintained to effect the separation of 2000 MSCF/D of high purity oxygen and 8000 MSCF/D of nitrogen.

The selective adsorption column 108 is provided at successively lower levels with hopper 109, secondary adsorption zone 110, primary adsorption zone 111, rectification zone 112, primary desorption zone 113, primary sealing zone 114, cooling zone 115, secondary sealing zone 116, secondary adsorption zone 117, feeding zone 118, and bottom zone 119. Selective adsorption column 108 is further equipped with means for the introduction and withdrawal of the feed gas, recycle gas streams, and gas products. These means are termed engaging or disengaging trays depending upon their use and may comprise a horizontal plate filling the entire cross sectional area of selective adsorption column 108 and provided with a series of short tubes extending downward from the aforementioned plate and integrally attached thereto in such a fashion that the downwardly flowing charcoal passes through the tubes and forms a free gas space between the tubes and below the plate. This plate and tube combination comprises a tray which facilitates the introduction and removal of gases to and from selective adsorption column 108. Bleed gas disengaging tray 120, lean gas disengaging tray 121, feed gas engaging tray 122, primary recycle gas disengaging tray 123, secondary recycle gas engaging tray 124, secondary recycle gas disengaging tray 125, primary recycle gas engaging tray 126 and purified feed gas disengaging tray 127 comprise such plate and tube combinations as described.

Feeding zone 118 contains structures similar to the disengaging and engaging trays included in the column but which are here employed to insure a uniform downward flow of solid granular charcoal throughout the entire cross sectional area of the column. Feeding zone 118 comprises a stationary tray 128, a movable tray 129 and a stationary perforated plate 130. Movable tray 129 is adapted to receive charcoal discharged through the tubes of stationary tray 128 and to discharge the charcoal downwardly through stationary perforated plate 130 to collect in bottom zone 119. Motive means 131 attached directly to movable tray 129 is employed to impart thereto a reciprocating motion permitting a constant downward flow of solid granular charcoal through the selective adsorption column 108. The solid granular charcoal flow rate is variable by changing the speed with which motive means 131 reciprocates movable tray 129.

The solid granular charcoal thus discharged into bottom zone 119 passes downwardly through a level control mechanism which is adapted to maintain a charcoal level 132 within bottom zone 119. The solid granular adsorbent flows downwardly through and around grid structure 133 supported directly upon movable receptacle 134 which is supported within receptacle housing 135 by means of suspension arm 136. The solid granular charcoal flows downwardly through receptacle 134 and through sealing leg 137. The solid granular charcoal discharged from the lower extremity of sealing leg 137 flows downwardly through flow control valve 138, transfer line 139 and is subsequently discharged into lift line 140. At the junction of transfer line 139 and lift line 140 a charcoal-lift gas suspension is formed by means of which the charcoal is conveyed to the upper portion of selective adsorption column 108 under pressure generated by lift gas blower 141 controlled by valve 142. The upper end of lift line 140 extends into impactless separator 143 wherein the charcoal-lift gas suspension is broken, the charcoal settles out as a dense phase, and the charcoal and lift gas are introduced as substantially independent phases by means of transfer line 144 into the upper part of selective adsorption column 108. In the top portion of the column the lift gas is completely disengaged from the charcoal which accumulates in hopper 109 and the lift gas is removed by means of lift gas return line 145 connected to the suction inlet 146 of lift gas blower 141. The charcoal thus introduced into the upper portion of selective adsorption column 108 flows downwardly through the aforementioned zones wherein it serves a dual purpose of a separating agent for the fractionation of the air into high purity streams of oxygen and nitrogen and also as a heat transfer medium. The charcoal accumulating in bottom zone 119 is removed therefrom as previously described and recirculated in the process.

Air obtained from the atmosphere contains contaminants consisting largely of water and carbon dioxide and other compounds depending largely upon the surrounding community. In some areas certain quantities of hydrocarbons are found in the air. It is desirable to remove atmospheric contaminants from the air in order to obtain a high purity oxygen product. The air to be separated is introduced by means of line 107 below charcoal feeding zone 118 into bottom zone 119 at a pressure of 220 pounds per square inch absolute at a temperature of 86° F. This air passes upwardly through feeding zone 118 and passes upwardly countercurrent to downwardly flowing charcoal in secondary adsorption zone 117. Within zone 117 carbon dioxide, water, and hydrocarbon contaminants, if present, are adsorbed to form a contaminated charcoal and purified air, that is, oxygen and nitrogen free from the above contaminants. The thus contaminated charcoal is removed from the lower portion of secondary adsorption zone 117 and returned as previously described to the upper portion of selective adsorption column 108. The purified air passes upwardly through secondary adsorption zone 117 countercurrent to a downwardly flowing bed of cool charcoal which enters secondary adsorption zone 117 at a temperature of −15° F. The purified air in contacting the cold charcoal is cooled substantially to the same temperature. The adsorption of atmospheric contaminants on the charcoal present in secondary adsorption zone 117 liberates a certain quantity of heat since the adsorption of gases is, in general, an exothermic phenomenon. The thermocouple point or other temperature sensitive means 147 is maintained in contact with the charcoal in secondary adsorption zone 117 so that the presence of the atmospheric contaminants at that point within zone 117 may be detected. Thermocouple 147 is connected to controller 148 which in turn actuates control valve 106 to vary the rate of flow of air introduced into bottom zone 119. Should the flow rate of air be sufficiently high that a portion of the contaminants are unadsorbed during the passage of air through secondary adsorption zone 117 the temperature indicated by thermocouple 147 rises and controller 148 acts to close valve 106 in order to decrease the quantity of air introduced. Thermocouple 147, controller 148, and control valve 106 function together to insure that the cooled purified air removed from disengaging tray 127 is maintained at a consistently high purity.

The cooled purified air is removed from disengaging tray 127 by means of line 149 at a temperature of −15° F. and is passed through refrigerator 150 wherein the temperature is decreased to −22° F. Refrigerator 150 consists of compressor 151, refrigerant cooler 152, and control valve 153. The refrigerant may comprise ammonia or other suitable material capable of operating at temperatures in the range of −20° F. to −25° F. The further cooled air is removed from refrigerator 150 by means of line 154 and is passed through refrigerator 155 wherein the major proportion of the refrigeration takes place. The air is cooled to a temperature of −40° F. by a refrigeration cycle which includes compressor 156, heat interchanger 157, and control valve 158. The refrigerant is compressed, passed through heat interchanger 157 by means of line 159 thereby condensing the refrigerant and heating the primary recycle gas passing therethrough. The condensed refrigerant is introduced by means of line 160, controlled by valve 158 into refrigerator 155 wherein the refrigerant evaporates thereby cooling the air to −40° F. and the evaporated refrigerant is returned to compressor 156. Since it is essential that the temperature gradient of the primary recycle gas passing through heat interchanger 157 remain constant it is likewise essential to smooth operation that the temperature gradient of the air passing through refrigerator 155 also remain constant. For this reason variations in temperature of cooled purified air removed from secondary adsorption zone 117 may be compensated for by refrigeration supplied by refrigerator 150. Thermocouple 161, and controller 162 act together to measure the temperature of the refrigerated air leaving refrigerator 155 and actuated control valve 153 so as to maintain the air introduced by means of line 163 into air engaging tray 122 at a constant temperature of −40° F.

The cold and purified air thus introduced passes upwardly through primary adsorption zone 111 countercurrent to a downwardly flowing bed of granular charcoal. During the passage of the air therethrough a substantially complete adsorption of the oxygen in the air is effected and a small amount of nitrogen is also adsorbed to form a rich charcoal and a lean gas consisting essentially of nitrogen. The nitrogen passes upwardly through the upper portion of primary adsorption zone 111 countercurrent to the downwardly flowing charcoal and a direct heat exchange between the cold nitrogen and the downwardly flowing charcoal is effected. The nitrogen is thus warmed to a temperature of about 80° F. and a portion of the nitrogen is removed from lean gas disengaging zone 121 by means of line 164 controlled by valve 165 and is introduced into separator 166 wherein traces of suspended charcoal are removed from the lean gas. The separated charcoal is removed from separator 166 by means of line 167 controlled by valve 168 and the lean gas is removed by means of line 169 and sent to storage or further processing not shown at a rate of 5300 MSCF/D. The remaining portion of the nitrogen or lean gas flowing upwardly from primary adsorption zone 111 passes upwardly through secondary desorption zone 110 at a temperature of about 85° F. countercurrent to the downwardly flowing contaminated charcoal introduced into the upper portion of selective adsorption column 108. This nitrogen effectively desorbs the atmospheric contaminants from the contaminated charcoal to form a bleed gas consisting of nitrogen, carbon dioxide, water vapor, etc. This bleed gas is removed from disengaging zone 120 by means of line 170 controlled by valve 171 at a rate of 2700 MSCF/D and is sent to storage or further processing, not shown, by means of line 172. A small portion of this bleed gas which may pass upwardly through the contaminated charcoal present in hopper 109 can be removed together with the lift gas withdrawn therefrom by means of line 145.

The rich charcoal formed in primary adsorption zone 111 and which comprises oxygen together with a small portion of nitrogen adsorbed on the charcoal flows downwardly through air engaging tray 122 into rectification zone 112. Herein the rich charcoal is countercurrently contacted with a reflux gas containing a high concentration of oxygen thereby effecting a preferential desorption of the small quantity of adsorbed nitrogen. This desorbed nitrogen passes upwardly into primary adsorption zone 111 and is subsequently removed with the lean gas product. In the lower portion of rectification zone 112 wherein the rectified adsorbent, freed of adsorbed nitrogen, is contacted with the aforementioned reflux gas a temperature break is established due to the effect on the charcoal of a gas containing a higher concentration of oxygen. The thermocouple 173 is maintained in contact with the rectified charcoal present in rectification zone 112 at a suitable position to measure a charcoal temperature intermediate between the upper and lower temperatures of the temperature break. Controller 174 is provided to vary the quantity of reflux introduced into rectification zone 112 in accordance with the aforementioned temperature break.

The rectified charcoal flows downwardly through primary recycle gas disengaging zone 123 into primary desorption zone 113. Within this zone the rectified charcoal is heated by the recirculation of a portion of an oxygen product or rich gas removed from secondary recycle gas disengaging zone 125 and from which the rich gas or oxygen product is withdrawn. A portion of the oxygen product is removed therefrom by means of line 175 by means of blower 176 and introduced by means of line 177 controlled by valve 178 into secondary recycle gas heater 179. The heated secondary recycle gas is introduced by means of line 180 into secondary recycle gas engaging zone 124 wherefrom the major portion of the heated gas passes upwardly through primary desorption zone 113. A direct heat exchange is herein effected between the heated gas and the rectified charcoal increasing the temperature of the charcoal and desorbing oxygen therefrom which passes upwardly and enters primary recycle gas disengaging zone 123. A portion of the thus desorbed oxygen passes upwardly into rectification zone 112 to serve therein as the reflux previously described while the remainder amounting to 395,000 standard cubic feet per hour is removed from disengaging zone 123 at a temperature of −31° F. by means of line 181 controlled by valve 182 and is passed through heat interchanger 157. Control valve 182 is actuated by thermocouple 183 and controller 184 and is introduced at a controlled rate by means of line 185 into heat interchanger 157 wherein it is heated to a temperature of −13° F. The thus heated primary recycle oxygen is removed from heat interchanger 157 and introduced by means of line 186 into primary recycle gas engaging zone 126. The recycle oxygen thus introduced passes upwardly through adsorbent cooling zone 115 in direct contact with the downwardly flowing charcoal and is warmed from a temperature of −13° F. to 85° F. A portion of this oxygen is removed as a rich gas product from secondary recycle disengaging zone 125 by means of line 187 controlled by valve 188 in accordance with the temperature break established in the vicinity of thermocouple 173 in rectification zone 112. The rich gas or oxygen product is passed by means of line 189 into separator 190 wherein traces of suspended charcoal are removed. These charcoal fines are removed from separator 190 by means of line 191 controlled by valve 192 and the oxygen product, free of suspended charcoal is removed from separator 190 at a rate of about 85,000 standard cubic feet per hour through line 193 and is sent to storage or further processing, not shown. The purity of the oxygen product thus produced may rise to as high as 99.0% by volume of oxygen or higher depending upon the quantity of air and charcoal passed through the selective adsorption column and operating conditions of temperature and pressure.

The product oxygen in passing through adsorbent cooling zone 115 cools the charcoal from a temperature of about 86° F. to a temperature of −15° F. at which temperature it passes downwardly from adsorbent cooling zone 115 through secondary sealing zone 116 and is introduced by means of pure air disengaging zone 127 into secondary adsorption zone 117. In the latter zone which comprises a pretreating zone as previously described, the incoming air to be separated is both cooled and purified. The charcoal in passing through secondary adsorption zone 117 is warmed from a temperature of about −15° F. to a temperature between about 80° F. and 85° F. at which temperature it passes downwardly through feeding zone 118 at a controlled rate of flow. The incoming air passes upwardly through feeding zone 118 and enters secondary adsorption zone 117 wherein water, carbon dioxide and any hydrocarbons comprising contaminants present in the air are adsorbed. This adsorption establishes a temperature break which, as previously described, is employed with the aid of thermocouple 147 and controller 148 to vary the rate of air introduced into the system.

The products obtained from 10,000 MSCF/D of atmospheric air comprise a lean gas consisting of substantially pure nitrogen and a rich gas consisting of substantially pure oxygen. The bleed gas produced consists of nitrogen and the atmospheric contaminants desorbed from the contaminated charcoal in secondary desorption zone 110. The rich gas is produced at a rate of 2,000 MSCF/D or 83,400 standard cubic feet per hour. This rich gas contains 98.0% oxygen, and about 2% nitrogen which corresponds to an overall oxygen recovery based on the quantity of air processed of 93.5% by volume. The lean gas product is produced at a rate of 5300 MSCF/D or 221,000 standard cubic feet per hour. This lean gas consists of better than 98% by volume of nitrogen and contains less than 2% by volume of oxygen. The bleed gas is removed at a rate of 2700 MSCF/D or 113,000 standard cubic feet per hour and contains substantially all of the atmospheric contaminants removed from the air.

The charcoal employed in the process of Figure 3 is preferably granular, about 10 to 14 mesh although granules as large as about four mesh and as small as about 100 or smaller may be employed in specific instances. The term charcoal used in the foregoing description is meant to include any animal, vegetable, or mineral carbon, the preferable form being an activated vegetable charcoal such as that prepared from coconut hulls or fruit pits.

The pressures of operation of air separation may be between atmospheric and 500 pounds per square inch absolute but preferably are between about 150 and 300 pounds per square inch absolute.

The length of life of the charcoal, that is, the duration of time which the adsorbent exhibits its normal adsorption capacity, depends largely upon the nature of the components present in the gaseous mixture introduced into the selective adsorption column. In normal operation of the selective adsorption column, a small amount, that is, between about 5% and 15% by weight of the charcoal flow rate may be removed and subjected to a high temperature reactivation should constituents of the gaseous mixture be tenaciously adsorbed by the adsorbent and not desorbed in the desorption zone. Such an operation is generally conducted in a tubular heater connected in parallel with the charcoal adsorber.

It is to be understood that the specific separation employed in the description of Figure 3 has been used here for purposes of description only and that other adsorbents are applicable to the improved subatmospheric temperature selective adsorption process herein described. The apparatus of the present invention may be employed in the separation of gaseous mixtures using adsorbents other than granular charcoal. Such solid granular adsorbents, for example, as silica gel, activated aluminum oxide, and various adsorbents formed from iron, chromium and other metal oxides may be employed. Activated charcoal prepared from coconut hulls is, as previously indicated, the preferred granular adsorbent. The improved process, while thoroughly described in connection with its application in the fractionation of air, may also be applied to good advantage in the separation of other gaseous mixtures which, if separated by conventional distillation methods would require excessively low distillation temperatures and the accompanying high refrigeration duties. Such gaseous mixtures may include at least one of the following constituents, helium and other rare gases, hydrogen, methane, carbon monoxide, carbon dioxide, nitrogen, oxygen, nitrogen oxides and others. The application of the improved selective adsorption process to the separation of these gaseous mixtures permits a substantial reduction in the amount of refrigeration required to perform the separation, a substantial increase in the temperature at which the separation may be effected, and the production of substantially pure fractions containing constituents present in the gaseous mixture.

A modification exists in the manner in which the granular adsorbent is conveyed from the bottom of the selective adsorber to the top thereof in which bucket elevators are applicable. In some instances such as, for example, at the lower pressures the use of elevators to transport the adbsorbent is of advantage but in general the use of the gas lift system shown in the drawing described in the description thereof is to be preferred.

Having described and illustrated our invention and realizing that many modifications thereof may occur to those skilled in the art without departing from the spirit and scope of the following claims.

I claim:

1. A process for the separation of gaseous mixtures which comprises contacting said gaseous mixture in a separation zone with a moving bed of solid granular adsorbent thereby adsorbing the more readily adsorbable constituents of said gaseous mixture to form a rich adsorbent and leaving the less readily adsorbable constituents substantially unadsorbed as a lean gas, subsequently desorbing said more readily adsorbable constituents from said rich adsorbent to form a rich gas and a lean adsorbent, removing a portion of said rich gas from said separation zone, indirectly heating said portion, subsequently returning the heated portion to said separation zone, directly contacting and heating a rectified adsorbent with said heated portion to desorb said more readily adsorbable constituens and form said rich gas and a lean absorbent, subsequently contacting said rich adsorbent with a portion of the thus desorbed more readily adsorbable constituents as reflux to desorb less readily adsorbable constituents and form said rectified adsorbent, subsequently passing said portion of rich gas in direct contact with said lean adsorbent to cool said adsorbent and heat said rich gas, joining said portion of rich gas with said remaining portion, removing the remaining portion of said rich gas from said separation zone as a rich gas product, removing said lean gas from said separation zone as a lean gas product, and returning said lean absorbent to said separation zone to contact further quantities of said gaseous mixture.

2. A selective adsorption process for the separation of gaseous mixtures containing impurities which comprises contacting said gaseous mixture in a pretreating zone with a moving bed of a lean solid granular adsorbent so as to adsorb said impurities and form a purified gaseous mixture and a contaminated adsorbent, removing the thus purified gaseous mixture and introducing said purified gaseous mixture into a separation zone, contacting the purified gaseous mixture in said separation zone with a moving bed of pure solid granular adsorbent therein adsorbing more readily adsorbable constituents to form a rich adsorbent and leaving less readily adsorbable constituents substantially unadsorbed as a lean gas, subsequently desorbing said more readily adsorbable constituents from said rich adsorbent to form a rich gas, heating a portion of said rich gas and contacting further quantities of said rich adsorbent therewith to heat said rich adsorbent thus desorbing said rich gas and forming a lean adsorbent, passing said lean adsorbent from said separation zone to said pretreating zone, passing said contaminated adsorbent from said pretreating zone to said separation zone, employing a portion of said lean gas to desorb said impurities from said contaminated adsorbent to form said pure solid granular adsorbent, removing the remaining portion of said lean gas from said separation zone as a lean gas product, removing the remaining portion of said rich gas from said separation zone as a rich gas product, and returning said purified adsorbent to said separation zone to contact further quantities of said purified gaseous mixture.

3. A selective adsorption process for the separation of impure gaseous mixtures which comprises contacting said impure gaseous mixture with a solid granular adsorbent in a purification and cooling zone to adsorb impurities from said gaseous mixture to form a cooled purified gaseous mixture and a heated contaminated adsorbent, passing said contaminated adsorbent from said purification and cooling zone to a separation zone, passing said cooled and purified gaseous mixture from said purification and cooling zone to said separation zone, contacting said cooled gaseous mixture therein with a moving bed of cooled lean adsorbent to adsorb more readily adsorbable constituents to form a rich adsorbent and leaving the less readily adsorbable constituents substantially unadsorbed as a lean gas, passing a portion of said lean gas through said heated contaminated adsorbent to heat said portion of lean gas and desorb said impurities and cool said adsorbent to form said cooled lean adsorbent, subsequently desorbing said more readily adsorbable constituents from said rich adsorbent to form a rich gas and a lean adsorbent, heating a portion of said rich gas and contacting further quantities of said rich adsorbent therewith to heat said rich adsorbent and thus desorb said rich gas, removing the remaining portion of said rich gas from said separation zone as a rich gas product, removing the remaining portion of said lean gas from said separation zone as a lean gas product, and passing said lean adsorbent from said separation zone to said purification zone to contact further quantities of said impure gaseous mixture.

4. A process according to claim 2 wherein said solid granular adsorbent comprises an adsorbent selected from the class consisting of activated charcoal, activated bauxite, activated aluminum oxide, and silica gel.

5. A process according to claim 3 wherein said solid granular adsorbent comprises an adsorbent selected from the class consisting of activated charcoal, activated bauxite, activated aluminum oxide, and silica gel.

6. A process according to claim 3 wherein the separation of said gaseous mixtures is performed under pressure of between that of the normal atmosphere and 500 pounds per square inch absolute.

7. A process for the separation of oxygen from air by continuous selective adsorption which comprises contacting air in a separation zone with a downwardly moving bed of activated charcoal to adsorb oxygen from said gaseous mixture to form a rich charcoal and leaving nitrogen substantially unadsorbed as a lean gas, subsequently desorbing said oxygen from said rich charcoal to form a rich gas and a lean charcoal, removing a portion of said oxygen from said separation zone, indirectly heating said portion, returning the heated portion to said separation zone, directly contacting and heating a rectified charcoal with said heated portion to desorb said oxygen as a rich gas product leaving a lean charcoal, subsequently contacting said rich charcoal with part of the thus desorbed rich gas as reflux to desorb nitrogen therefrom forming said rectified charcoal, subsequently passing said part of desorbed rich gas in direct contact with said lean charcoal to cool said charcoal and heat said rich gas, removing the remaining portion of said oxygen from said separation zone to form a rich gas product, removing said nitrogen from said separation zone as a lean gas product, and returning said lean charcoal to contact further quantities of air in said separation zone.

8. A process for the separation of oxygen from air containing impurities which comprises contacting said air in a pretreating zone with charcoal so as to adsorb said impurities to form purified air and a contaminated charcoal, removing the thus purified air and introducing said purified air into a separation zone, contacting said purified air therein with a moving bed of lean charcoal to adsorb oxygen to form a rich charcoal and leaving nitrogen substantially unadsorbed to form a lean gas, subsequently desorbing said oxygen from said charcoal to form a rich gas, heating a portion of said rich gas and contacting further quantities of said rich charcoal therewith to heat said rich charcoal thus desorbing said rich gas and forming a lean charcoal, passing said lean charcoal from said separation zone to said pretreating zone, passing said contaminated charcoal from said pretreating zone to said separation zone, employing a portion of said lean gas to desorb said impurities from said contaminated charcoal to form a lean charcoal, removing the remaining portion of said lean gas from said separation zone as a lean gas product, removing the remaining portion of said rich gas from said separation zone as a rich gas product, and returning said pure charcoal to contact further quantities of said purified air in said separation zone.

9. A process according to claim 8 wherein said impurities comprise carbon dioxide, water vapor and hydrocarbon gases and wherein the operation pressure is between about 150 and 300 pounds per square inch absolute.

10. A process for the separation of oxygen from air containing atmospheric contaminants which comprises contacting said air with a lean charcoal in a purification and cooling zone so as to adsorb said contaminants from said air to form a cooled purified gaseous mixture and a heated contaminated charcoal, passing said heated contaminated charcoal from said purification and cooling zone to a separation zone, passing said cooled and purified air from said purification and cooling zone to said separation zone, contacting said cooled purified air therein with a moving bed of cooled charcoal to adsorb oxygen to form a rich charcoal and leaving the nitrogen substantially unadsorbed as a lean gas, passing a portion of said lean gas through said heated contaminated charcoal so as to heat said portion of said lean gas and desorb said contaminants from said contaminated charcoal to form a cooled pure charcoal, subsequently desorbing said oxygen from said rich charcoal to form a rich gas and a lean charcoal, heating a portion of said rich gas and contacting further quantities of said rich charcoal therewith to heat said rich charcoal and thus desorb said rich gas, removing the remaining portion of said rich gas from said separation zone as a rich gas product, removing the remaining portion of said lean gas from said separation zone as a lean gas product, and passing said lean charcoal from said separation zone to said purification and cooling zone to contact further quantities of said air.

11. A continuous selective adsorption process for the separation of gaseous mixtures which comprises establishing a separation zone comprising at lower levels a primary adsorption zone, a rectification zone, a primary desorption zone and an adsorbent cooling zone, establishing a continuous downwardly moving bed of granular adsorbent through said separation zone, introducing said gaseous mixture into said primary adsorption zone to contact said adsorbent to adsorb the more readily adsorbable constitutents of said gaseous mixture forming a rich adsorbent and a lean gas comprising the less readily adsorbable constituents, passing said lean gas upwardly through said primary adsorption zone in direct countercurrent contact with said moving bed of adsorbent to effect heat interchange between said lean gas and said adsorbent, subsequently removing said lean gas as a lean gas product from said primary adsorption zone, passing said rich adsorbent from said primary adsorption zone to said rectification zone, contacting said rich adsorbent therein with a rich gas reflux containing more readily adsorbable constituents whereby small amounts of less readily adsorbable constituents are desorbed forming a rectified adsorbent, passing said rectified adsorbent to said primary desorption zone wherein said more readily adsorbable constituents are desorbed to form a rich gas, heating a portion of said rich gas, passing said heated portion in direct countercurrent contact with said rectified adsorbent thereby heating said adsorbent and desorbing further quantities of said rich gas, passing the thus desorbed rich gas through said adsorbent cooling zone in direct countercurrent contact with heated adsorbent passing therethrough to effect direct heat interchange therebetween forming a warmed rich gas and a cooled adsorbent, removing said warmed rich gas as a rich gas product, and passing said cooled desorbent from said adsorbent cooling zone to said primary adsorption zone for reuse.

12. A process according to claim 11 wherein the flow rate of said rich gas product removed from said adsorbent cooling zone is controlled in accordance with a temperature break maintained within said rectification zone and wherein said separation process is performed at a pressure between that of the normal atmosphere and about 500 pounds per square inch absolute.

13. A process according to claim 11 wherein said gaseous mixture comprises atmospheric air, said lean gas comprises substantially pure nitrogen, and said rich gas comprises substantially pure oxygen.

14. A process according to claim 11 wherein said solid granular adsorbent is selected from the class consisting of silica gel, activated aluminum oxide, activated charcoal, and adsorbent iron and chromium oxides.

15. A continuous selective adsorption process for the separation of atmospheric air containing carbon dioxide, water, and hydrocarbons by adsorption on a granular charcoal which comprises establishing a separation zone provided at lower levels therein with a secondary desorption zone, a primary adsorption zone, a rectification zone, a primary desorption zone, an adsorbent cooling zone, and a pretreating zone comprising a secondary adsorption zone, establishing a continuous downwardly moving bed of charcoal passing through said separation zone and said purification zone, introducing air substantially free from suspended solids and liquids into said secondary adsorption zone to pass upwardly therethrough in countercurrent contact with said charcoal to adsorb the carbon dioxide, water, and hydrocarbon contaminants to form a purified mixture of oxygen and nitrogen and a contaminated charcoal, passing said contaminated charcoal from said secondary adsorption zone to said secondary desorption zone, passing said purified mixture upwardly countercurrent to said charcoal effecting a direct heat interchange therebetween to form a cooled purified air and a warmed adsorbent, passing said cooled and purified air from said secondary adsorption zone into said primary adsorption zone to contact said charcoal and adsorb said oxygen and a small amount of said nitrogen contained therein to form a rich charcoal and a substantially unadsorbed lean gas comprising nitrogen, passing said lean gas upwardly through said primary adsorption zone in direct countercurrent contact with said charcoal to effect heat interchange therebetween to form a warmed lean gas and a cooled lean charcoal, subsequently removing a portion of said cooled lean gas as a substantially pure nitrogen product from said primary adsorption zone, passing the remaining portion of said lean gas upwardly through said secondary desorption zone thereby desorbing said contaminants from said warmed contaminated charcoal to form a lean charcoal and a bleed gas containing nitrogen and said contaminants, passing said rich charcoal from said primary adsorption zone to said rectification zone, contacting said rich charcoal therein with a rich gas reflux containing oxygen thereby desorbing said small amounts of nitrogen to form a rectified charcoal, passing said rectified charcoal to said primary desorption zone wherein said oxygen is desorbed to form a rich gas, heating a portion of said rich gas as a secondary recycle gas and passing same upwardly in direct countercurrent contact with said rectified charcoal passing downwardly through said primary desorption zone so as to heat said rectified charcoal and to desorb further quantities of oxygen as a primary recycle gas, passing a portion of the thus desorbed oxygen into said rectification zone to serve therein as said rich gas reflux, passing the remaining portion of said oxygen removed from said primary desorption zone as a primary recycle gas upwardly through said adsorbent cooling zone in direct countercurrent contact with said charcoal flowing downwardly therethrough to effect a direct heat interchange therebetween to form a warmed rich gas and a cooled charcoal, removing a portion of said rich gas from said adsorbent cooling zone as a rich gas oxygen product, employing the remaining portion as said secondary recycle gas, and passing said cooled charcoal downwardly from said adsorbent cooling zone to said secondary adsorption zone where said air is cooled and purified of contaminants.

16. A process according to claim 15 wherein said separation process is performed at a pressure of between about 100 and 300 pounds per square inch absolute.

17. A process according to claim 15 wherein said flow rate of rich gas oxygen product is controlled in accordance with a temperature break maintained within said rectification zone, said flow rate of said primary recycle gas is controlled in accordance with a temperature break maintained within said primary desorption zone, the flow rate of said contaminated air introduced into said secondary adsorption zone is controlled in accordance with a temperature break maintained within said secondary adsorption zone, and the rate of transfer of heat from said cooled purified air to said primary recycle gas is controlled in accordance with a temperature break maintained within said adsorbent cooling zone.

18. An apparatus for the separation of gaseous mixtures at atmospheric and subatmospheric temperatures which comprises a selective adsorption column provided with an adsorption zone, a rectification zone, a desorption zone and an adsorbent cooling zone, means for passing adsorbent removed from the bottom of said column to the top thereof, means provided between said aforementioned zones adapted to the introduction and removal of gases to and from said column, means for removing a lean gas product from said adsorption zone, means for removing a recycle gas from said desorption zone, means for heating said recycle gas, means for introducing the thus heated recycle gas into said adsorbent cooling zone, means for introducing said gaseous mixture to be separated into said adsorption zone, means for effecting heat interchange between said recycle gas and said gaseous mixture so as to warm the former and cool the latter gas, and means for removing a rich gas product from said adsorbent cooling zone.

19. An apparatus for the continuous separation of gaseous mixtures at atmospheric and subatmospheric temperatures which comprises a selective adsorption column provided with a separation zone and a pretreating zone, said separation zone comprising an adsorption zone, a rectification zone, a desorption zone and an adsorbent cooling zone, means for passing a solid granular adsorbent from said separation zone to said pretreating zone, means for passing adsorbent removed from the lower portion of said column to the upper portion thereof, means for introducing said gaseous mixture into said pretreating zone, means for removing a pretreated gaseous mixture from said pretreating zone, means for passing the thus pretreated gaseous mixture into said adsorption zone, means for removing a lean gas product from said adsorption zone, means for removing a recycle gas from said desorption zone and passing the thus removed recycle gas to said adsorbent cooling zone, means for effecting a heat interchange between said recycle gas and said pretreated gaseous mixture to effect the heating of the former and the cooling of the latter gas, means for cooling said pretreated gaseous mixture, means for heating said recycle gas, and means for removing a rich gas product from said adsorbent cooling zone.

20. An apparatus for the separation of gaseous mixtures at atmospheric and subatmospheric temperatures which comprises a selective adsorption column provided at successively lower levels therein with a secondary desorption zone, a primary adsorption zone, a rectification zone, a primary desorption zone, an adsorbent cooling zone, a secondary adsorption zone, and an adsorbent feeding zone, means interposed between said aforementioned zones adapted to the introduction and removal of gases to and from said adsorption column respectively, level control means positioned at the bottom of said selective adsorption column adapted to maintain a constant level of adsorbent in the bottom thereof below said feeding zone, an adsorbent flow control valve positioned below said level control means adapted to control the rate of flow of said adsorbent removed from the bottom of said adsorption column, means for passing adsorbent flowing through said flow control valve upwardly to be introduced into the upper portion of said selective adsorption column to pass downwardly by gravity therethrough as a moving bed, means for introducing said gaseous mixture into said secondary adsorption zone by passing upwardly through said adsorbent feeding zone, means for removing a purified and cooled gaseous mixture from said secondary adsorption zone, means for refrigerating said last-named gaseous mixture, means for introducing the thus refrigerated gaseous mixture into said adsorption zone, means for removing a lean gas product comprising the less readily adsorbable constituents of said gaseous mixture from said primary adsorption zone, means for removing a bleed gas containing contaminants present in said gaseous mixture together with less readily adsorbable constituents present in said lean gas from said secondary desorption zone, means for removing a portion of the more readily adsorbable constituents as a rich gas from said adsorbent cooling zone to form a secondary recycle gas, means for heating said secondary recycle gas and introducing said gas into said primary desorption zone, means for removing a primary recycle gas from said primary desorption zone, means for effecting heat interchange between said primary recycle gas and said refrigerated gesous mixture so as to heat the former and cool the latter gas, means for introducing the thus heated primary recycle gas into said adsorbent cooling zone, means for removing a rich gas product from said adsorbent cooling zone, means for controlling the flow rate of said rich gas in accordance with a temperature break maintained within said rectification zone, means for controlling the rate of flow of introduction of said gaseous mixture into said secondary adsorption zone in accordance with the temperature break maintained within said secondary adsorption zone, means for controlling the rate of flow of introduction of said gaseous mixture into said secondary adsorption zone in accordance with the temperature break maintained within said secondary adsorption zone, means for controlling the rate of flow of said primary recycle gas in accordance with a temperature break maintained within said primary desorption zone, and means for controlling the rate of heat interchange between said primary recycle gas and said refrigerated gaseous mixture in accordance with the temperature break maintained within said adsorbent cooling zone.

21. A process for the separation of gaseous mixtures which comprises contacting said gaseous mixture in a separation zone with a moving bed of solid granular adsorbent thereby adsorbing the more readily adsorbable constituents of said gaseous mixture to form a rich adsorbent and leaving less readily adsorbable constituents substantially unadsorbed as a lean gas, subsequently desorbing said adsorbed more readily adsorbable constituents from a rectified adsorbent forming a rich gas and a lean adsorbent, contacting said rich adsorbent with a portion of the thus desorbed rich gas as reflux to desorb less readily adsorbable constituents and form said rectified adsorbent; desorbing said rich gas from said rectified adsorbent by the steps of removing a portion of said rich gas from said separation zone, indirectly heating said portion, returning the heated portion to said separation zone, directly contacting and heating said rectified adsorbent to desorb said more readily adsorbable constituents and form said rich gas and said lean adsorbent; removing said lean adsorbent from said separation zone, removing the remaining portion of said rich gas from said separation zone as a rich gas product, removing said lean gas from said separation zone as a lean gas product, and returning said lean adsorbent to said separation zone to contact further quantities of said gaseous mixture.

22. A process for the separation of oxygen from air by continuous selective adsorption which comprises contacting air in a separation zone with a downwardly moving bed of solid granular adsorbent to adsorb oxygen from said air to form a rich adsorbent and leaving nitrogen substantially unadsorbed as a lean gas, subsequently desorbing oxygen from a rectified adsorbent forming a rich gas of substantially pure oxygen and a lean adsorbent, contacting said rich adsorbent with a portion of the thus desorbed oxygen as reflux to desorb traces of nitrogen therefrom and form said rectified adsorbent; desorbing said oxygen from said rectified adsorbent by the steps of removing another portion of said oxygen from said separation zone, indirectly heating said portion, returning the heated portion to said separation zone, directly contacting and heating said rectified adsorbent to desorb said oxygen therefrom and form said rich gas and said lean adsorbent; removing said lean adsorbent from said separation zone, removing the remaining portion of said oxygen from said separation zone to form a rich gas product, removing said nitrogen from said separation zone as a lean gas product, and returning said lean adsorbent to contact further quantities of air in said separation zone.

23. A process according to claim 22 wherein said solid granular adsorbent comprises activated charcoal.

CLYDE H. O. BERG.

REFERENCES CITED

The following references are of record in the file of this patent:

UNITED STATES PATENTS

| Number | Name | Date |
|---|---|---|
| 879,129 | Dewar | Feb. 11, 1908 |
| 1,422,007 | Soddy | July 4, 1922 |
| 1,825,707 | Wagner Jr. | Oct. 6, 1931 |
| 1,836,301 | Bechthold | Dec. 15, 1931 |
| 2,384,311 | Kearby | Sept. 4, 1945 |

FOREIGN PATENTS

| Number | Country | Date |
|---|---|---|
| 305,975 | Great Britain | Mar. 25, 1929 |
| 572,423 | Great Britain | Oct. 8, 1945 |